United States Patent
Wolf et al.

(10) Patent No.: US 11,972,676 B2
(45) Date of Patent: Apr. 30, 2024

(54) INITIATING A FIRE RESPONSE AT A SELF-TESTING FIRE SENSING DEVICE

(71) Applicant: Honeywell International Inc., Charlotte, NC (US)

(72) Inventors: Benjamin H. Wolf, Leicester (GB); Hariprasad Kozhikkotakathitta Veetil, Bangalore (IN); Himanshu Goyal, Jaipur (IN)

(73) Assignee: Honeywell International Inc., Charlotte, NC (US)

( * ) Notice: Subject to any disclaimer, the term of this patent is extended or adjusted under 35 U.S.C. 154(b) by 27 days.

(21) Appl. No.: 17/529,921

(22) Filed: Nov. 18, 2021

(65) Prior Publication Data

US 2023/0131206 A1 Apr. 27, 2023

Related U.S. Application Data (60) Provisional application No. 63/271,338, filed on Oct. 25, 2021.

(51) Int. Cl.
*G08B 29/14* (2006.01)
*G06F 3/04817* (2022.01)
*G08B 17/107* (2006.01)

(52) U.S. Cl.
CPC ....... *G08B 29/145* (2013.01); *G06F 3/04817* (2013.01); *G08B 17/107* (2013.01)

(58) Field of Classification Search
CPC .. G08B 29/145; G08B 17/107; G06F 3/04817
See application file for complete search history.

(56) References Cited

U.S. PATENT DOCUMENTS

| | | | | |
|---|---|---|---|---|
| 5,594,410 A | * | 1/1997 | Lucas | G08B 7/062 340/332 |
| 5,936,533 A | | 8/1999 | Bernal et al. | |
| 6,737,967 B2 | * | 5/2004 | Farley | G08B 29/145 340/506 |
| 7,242,292 B2 | * | 7/2007 | Berezowski | G08B 1/08 340/331 |
| 7,934,411 B2 | | 5/2011 | Koch | |
| 8,077,026 B2 | * | 12/2011 | Jobe | G08B 25/009 340/539.2 |

(Continued)

FOREIGN PATENT DOCUMENTS

| | | |
|---|---|---|
| AU | 2019203389 A1 | 11/2019 |
| DE | 20215640 U1 | 2/2003 |

(Continued)

*Primary Examiner* — Curtis J King
(74) *Attorney, Agent, or Firm* — Brooks, Cameron & Huebsch, PLLC (57) ABSTRACT

Devices, methods, and systems for causing a self-testing fire sensing device to initiate a fire response are described herein. One device includes a user interface, a memory, and a processor configured to execute executable instructions stored in the memory to receive, via the user interface, a selection to initiate a fire response, receive, via the user interface, a selection of a self-testing fire sensing device to initiate the fire response, transmit a command to the self-testing fire sensing device to initiate the fire response, and receive a notification of a number of output events triggered by the initiation of the fire response by the self-testing fire sensing device.

19 Claims, 6 Drawing Sheets

(56) References Cited

U.S. PATENT DOCUMENTS

| | | | |
|---|---|---|---|
| 8,228,182 B2* | 7/2012 | Orsini | G08B 29/126 250/206 |
| 8,933,811 B2 | 1/2015 | Højmose | |
| 9,076,313 B2* | 7/2015 | Piccolo, III | G08B 29/00 |
| 9,659,485 B2 | 5/2017 | Piccolo | |
| 9,959,748 B2 | 5/2018 | Moffa | |
| 10,078,959 B2 | 9/2018 | Rossi et al. | |
| 10,216,164 B2 | 2/2019 | Brown et al. | |
| 11,024,154 B1 | 6/2021 | Lang et al. | |
| 11,127,284 B1 | 9/2021 | Barson et al. | |
| 11,132,891 B2 | 9/2021 | Dearden et al. | |
| 11,410,534 B2* | 8/2022 | Arellano Valderrama | G08B 25/04 |
| 2002/0021224 A1* | 2/2002 | Schneider | G08B 29/145 340/628 |
| 2003/0146833 A1* | 8/2003 | Johnston | G08B 25/012 340/521 |
| 2003/0210138 A1* | 11/2003 | Farley | G08B 29/145 340/514 |
| 2004/0119585 A1* | 6/2004 | Farley | G08B 29/145 340/514 |
| 2004/0217857 A1* | 11/2004 | Lennartz | G08B 29/145 340/506 |
| 2005/0057353 A1* | 3/2005 | Barrieau | G08B 7/06 340/506 |
| 2005/0128079 A1* | 6/2005 | Berezowski | G08B 1/08 340/539.22 |
| 2005/0128097 A1* | 6/2005 | Piccolo, III | G08B 25/04 340/331 |
| 2005/0280527 A1* | 12/2005 | Farley | G08B 29/145 340/514 |
| 2007/0165523 A1* | 7/2007 | Berezowski | G08B 1/08 370/400 |
| 2007/0194907 A1* | 8/2007 | Tawil | G08B 29/14 340/514 |
| 2008/0084291 A1* | 4/2008 | Campion | G08B 29/145 340/514 |
| 2008/0219458 A1* | 9/2008 | Brooks | H03G 3/32 381/57 |
| 2010/0315224 A1* | 12/2010 | Orsini | G08B 29/126 340/506 |
| 2013/0239659 A1* | 9/2013 | Brighenti | G01N 21/4738 73/28.01 |
| 2014/0266675 A1* | 9/2014 | Piccolo, III | G08B 29/00 340/514 |
| 2014/0266677 A1* | 9/2014 | Piccolo, III | G08B 29/00 340/514 |
| 2014/0375449 A1* | 12/2014 | Piccolo, III | G08B 29/126 340/506 |
| 2016/0180700 A1* | 6/2016 | Butalla, III | G08B 29/126 340/514 |
| 2016/0328936 A1* | 11/2016 | Fischer | G01N 21/53 |
| 2017/0142854 A1* | 5/2017 | Varieur | E05C 3/145 |
| 2017/0193811 A1* | 7/2017 | Stowell | G08B 29/145 |
| 2017/0278381 A1* | 9/2017 | Nalukurthy | G08B 29/145 |
| 2017/0287318 A1* | 10/2017 | Moffa | G08B 29/043 |
| 2018/0012482 A1* | 1/2018 | Brown | G06F 3/0482 |
| 2018/0293878 A1* | 10/2018 | Penney | B05B 17/0646 |
| 2018/0312255 A1* | 11/2018 | Illuminati | G08B 29/12 |
| 2019/0213865 A1* | 7/2019 | S.R | G06T 19/006 |
| 2019/0233106 A1* | 8/2019 | Penney | G05D 1/101 |
| 2019/0291866 A1* | 9/2019 | Jegodtka | B64C 39/024 |
| 2019/0378402 A1* | 12/2019 | Bouchard | G08B 17/107 |
| 2020/0035088 A1* | 1/2020 | Penney | G08B 29/145 |
| 2020/0250963 A1* | 8/2020 | Rodriguez | G08B 29/145 |
| 2020/0394900 A1* | 12/2020 | Lontka | G08B 29/12 |
| 2021/0003310 A1* | 1/2021 | Shnaiderman | F24F 11/64 |
| 2021/0065536 A1 | 3/2021 | Dearden et al. | |
| 2021/0228927 A1* | 7/2021 | Hofmann | A62C 37/36 |
| 2021/0350692 A1* | 11/2021 | Nalukurthy | G06F 16/248 |
| 2021/0350693 A1* | 11/2021 | Nalukurthy | G08B 17/00 |
| 2022/0058929 A1* | 2/2022 | Dearden | G08B 17/107 |
| 2022/0058939 A1* | 2/2022 | Penney | G08B 17/113 |
| 2022/0101701 A1* | 3/2022 | Date | H04W 4/80 |
| 2022/0241634 A1* | 8/2022 | Krutskevych | G08B 25/04 |
| 2022/0392447 A1* | 12/2022 | Goriparti | G10L 15/22 |

FOREIGN PATENT DOCUMENTS

| | | |
|---|---|---|
| GB | 2176600 A | 12/1986 |
| GB | 2459322 A | 10/2009 |
| JP | 6016993 B2 | 10/2016 |
| KR | 1020060064747 A | 6/2006 |
| KR | 101987675 B1 | 9/2019 |
| WO | 0227293 A2 | 4/2002 |
| WO | 2021198313 A1 | 10/2021 |

* cited by examiner

INITIATING A FIRE RESPONSE AT A SELF-TESTING FIRE SENSING DEVICE

PRIORITY INFORMATION

This application claims priority to U.S. Provisional Application No. 63/271,338, filed Oct. 25, 2021, the contents of which are incorporated by reference.

TECHNICAL FIELD

The present disclosure relates generally to devices, methods, and systems for a self-testing fire sensing device.

BACKGROUND

Large facilities (e.g., buildings), such as commercial facilities, office buildings, hospitals, and the like, may have a fire alarm system that can be triggered during an emergency situation (e.g., a fire) to warn occupants to evacuate. For example, a fire alarm system may include a fire control panel and a plurality of fire sensing devices (e.g., smoke detectors), located throughout the facility (e.g., on different floors and/or in different rooms of the facility) that can sense a fire occurring in the facility and provide a notification of the fire to the occupants of the facility via alarms.

Maintaining the fire alarm system can include regular testing of fire sensing devices mandated by codes of practice that are slow and labor intensive. A typical test includes a first maintenance engineer using pressurized aerosol or a magnet to test the fire sensing device, a second maintenance engineer viewing an output event, and a third maintenance engineer at the fire control panel confirming which fire sensing device has been activated and which output event has been triggered. Depending on the size of the building this process can take days or weeks. When the authority having jurisdiction comes, the process must be repeated so they can witness that the fire alarm system is performing as designed.

DETAILED DESCRIPTION

Devices, methods, and systems for causing a self-testing fire sensing device (e.g., fire sensing device) to initiate a fire response are described herein. One device includes a user interface, a memory, and a processor configured to execute executable instructions stored in the memory to receive, via the user interface, a selection to initiate a fire response, receive, via the user interface, a selection of a fire sensing device to initiate the fire response, transmit a command to the fire sensing device to initiate the fire response, and receive a notification of a number of output events triggered by the initiation of the fire response by the self-testing fire sensing device.

In contrast to previous fire sensing devices in which a maintenance engineer would have to manually inspect and/or test (e.g., using pressurized aerosol, a heat gun, a gas generator, or any combination thereof) each fire sensing device to determine whether a fire sensing device was activating, fire sensing devices in accordance with the present disclosure can be activated by a computing device. For example, a maintenance engineer could use a mobile device to command a fire sensing device to initiate a fire response by triggering a synthesized software event at the fire sensing device and/or generating an aerosol density level within the fire sensing device.

In contrast to previous fire control systems in which a maintenance engineer would need to be at a control panel to determine whether a fire response was initiated at a fire sensing device and/or an output device was triggered by the initiation of the fire response at the fire sensing device, computing devices in accordance with the present disclosure can receive a notification whether a fire response was initiated at a fire sensing device and/or whether an output device was triggered by the initiation of the fire response. Accordingly, fire control systems in accordance with the present disclosure may allow verification of an initiation of a fire response at a fire sensing device and/or an output device being triggered from anywhere.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that mechanical, electrical, and/or process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits. For example, 104 may reference element "04" in FIG. 1, and a similar element may be referenced as 204 in FIG. 2.

As used herein, "a", "an", or "a number of" something can refer to one or more such things, while "a plurality of" something can refer to more than one such things. For example, "a number of components" can refer to one or more components, while "a plurality of components" can refer to more than one component.

Figure 1:
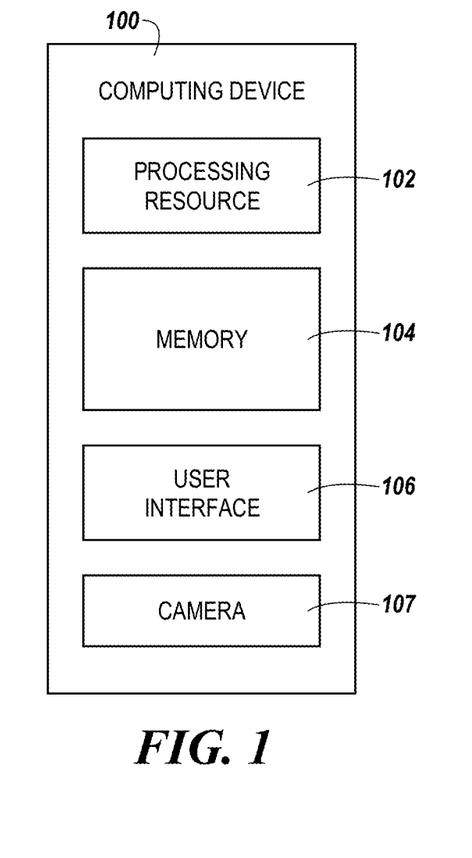
FIG. 1 illustrates a block diagram of a computing device for causing a self-testing fire sensing device to initiate a fire response in accordance with an embodiment of the present disclosure.

FIG. 1 illustrates a block diagram of a computing device 100 for causing a self-testing fire sensing device to initiate a fire response in accordance with an embodiment of the present disclosure. The computing device 100 can be, for example, a laptop computer, a desktop computer, a mobile device (e.g., a smart phone, tablet, personal digital assistant, smart glasses, a wrist-worn device, etc.), and/or redundant combinations thereof, among other types of computing devices. The computing device 100 can include a processing resource 102 (e.g., processor), a memory 104, a user interface 106, and a camera 107.

Memory 104 can be any type of storage medium that can be accessed by processor 102 to perform various examples of the present disclosure. For example, memory 104 can be a non-transitory computer readable medium having computer readable instructions (e.g., computer program instructions) stored thereon that are executable by processor 102 to cause a fire sensing device 100 to initiate a fire response in accordance with the present disclosure. For instance, processor 102 can execute the executable instructions stored in memory 104 to receive, via the user interface 106, a selection to initiate a fire response and a selection of a fire sensing device to initiate the fire response and transmit a command to the fire sensing device to initiate the fire response. For example, the user interface 106 can present a number of fire sensing devices and a user can select to initiate a fire response on a particular fire sensing device by selecting an icon associated with the particular fire sensing device.

The user interface 106 can be a graphical user interface (GUI) that can provide and/or receive information to and/or from a user. The user interface 106 can display notifications, messages, and/or data received from a fire sensing device, a control panel, and/or an output device. For example, the user interface 106 can display a number of output events triggered by the initiation of a fire response by a fire sensing device.

The number of output events triggered by the initiation of the fire response by the fire sensing device can be stored in memory 104. A video of performing the fire response can be recorded using camera 107 and the video can also be stored in memory 104. These can be used as records to prove that a fire response was performed, a fire sensing device was functioning, and/or output events were properly triggered.

Figure 2:
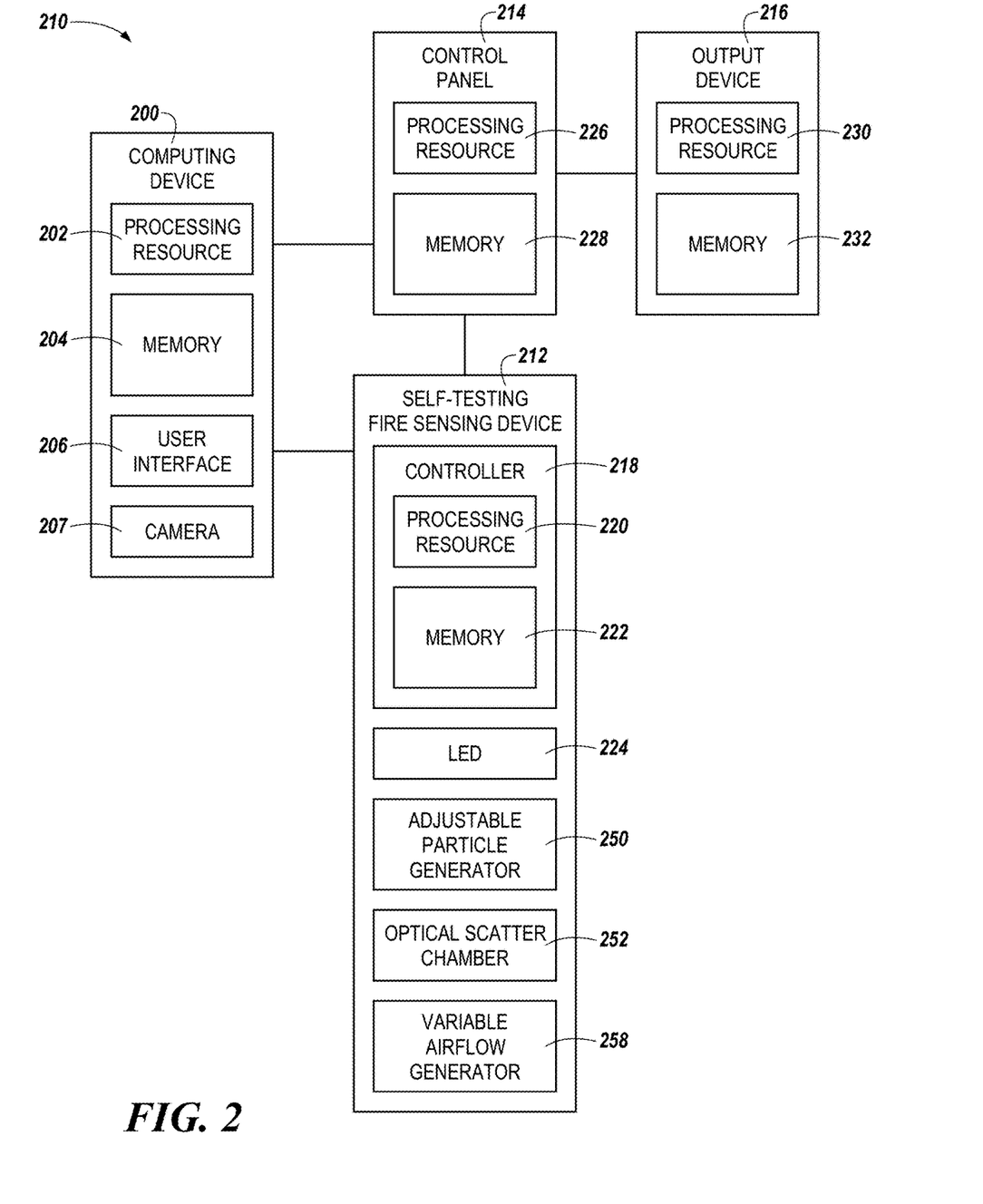
FIG. 2 illustrates a block diagram of a system for causing a self-testing fire sensing device to initiate a fire response in accordance with an embodiment of the present disclosure.

FIG. 2 illustrates a block diagram of a system 210 for causing a self-testing fire sensing device 212 to initiate a fire response in accordance with an embodiment of the present disclosure. The system 210 can be a fire control system or a fire alarm system and can include a computing device 200, a fire sensing device 212, a control panel 214, and an output device 216.

Computing device 200 can correspond to computing device 100 of FIG. 1. The computing device 200 can include a processor 202, a memory 204, a user interface 206, and a camera 207, which can correspond to processor 102, memory 104, user interface 106, and camera 107, respectively. The computing device 200 can be coupled to the control panel 214, the output device 216, and/or the fire sensing device 212.

The fire sensing device 212 can be, but is not limited to, a fire and/or smoke detector. A plurality of fire sensing devices can be located throughout a facility (e.g., on different floors and/or in different rooms of the facility). A fire sensing device 212 can sense a fire occurring in a facility and initiate a fire response to provide a notification of the fire to occupants of the facility. A fire response can include visual and/or audio alarms, for example. A control panel, an output device, or emergency services (e.g., fire departments, police departments, etc.) can be notified responsive to a fire sensing device initiating a fire response. In some examples, an output device can perform an output event responsive to receiving a notification that the fire sensing device 212 initiated a fire response.

A fire sensing device 212 can automatically or upon command initiate one or more fire responses. The one or more fire responses can determine whether the fire sensing device 212 is functioning properly and/or requires maintenance. As shown in FIG. 2, fire sensing device 212 can include a controller 218, a processor 220, a memory 222, a light-emitting diode (LED) 224, an adjustable particle generator 250, an optical scatter chamber 252, and a variable airflow generator 258. The fire sensing device 212 can be configured to turn on the LED 224 responsive to the fire sensing device initiating the fire response. A visual inspection of the fire sensing device can include witnessing and/or recording whether the LED 224 turned on during the fire response.

Figure 4:
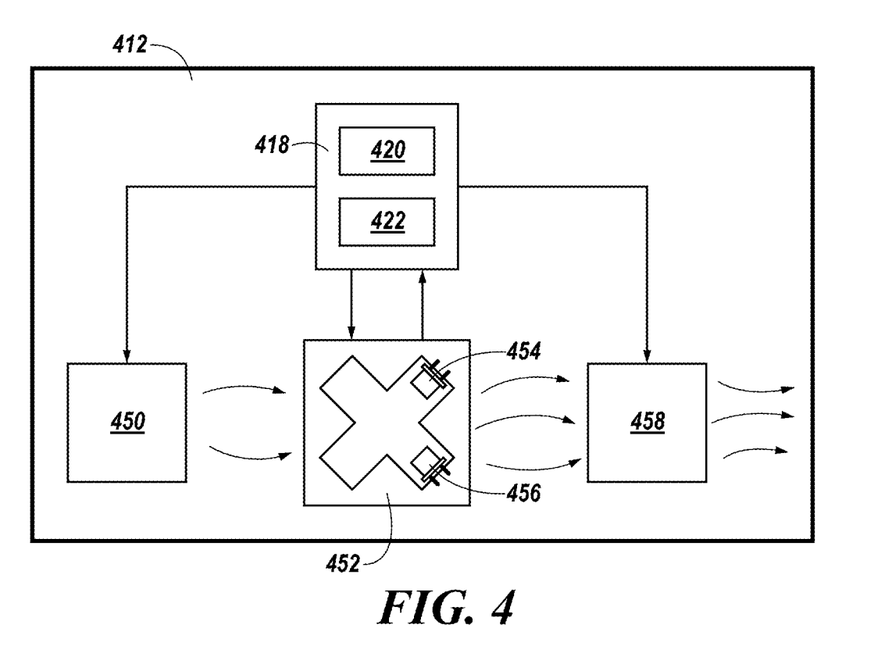
FIG. 4 illustrates a block diagram of a self-test function of a fire sensing device in accordance with an embodiment of the present disclosure.

The functionality of the controller 218, the processor 220, the memory 222, the adjustable particle generator 250, the optical scatter chamber 252, and the variable airflow generator 258 can be analogous to that further described herein for controller 418, processor 420, memory 422, adjustable particle generator 450, optical scatter chamber 452, and variable airflow generator 458 in connection with FIG. 4.

The fire sensing device 212 can be coupled to the control panel 214. The control panel 214 can be a control unit, which can be a physical fire control panel (e.g., box) installed in the facility, a non-physical control unit, or a control unit located remotely from the facility that can be used by a user to directly control the operation of components of the fire control system 210.

The control panel 214 can include a processor 226 and a memory 228. Memory 228 can be any type of storage medium that can be accessed by processor 226 to perform various examples of the present disclosure. For example, memory 228 can be a non-transitory computer readable medium having computer readable instructions stored thereon that are executable by processor 226 to cause the control panel 214 to receive a notification that the fire sensing device 212 initiated a fire response and transmit the notification that the fire sensing device 212 initiated the fire response to the computing device 200. The control panel 214 can include logic that can be triggered responsive to initiating the fire response by the self-testing fire sensing device 212. For example, the control panel 214 can receive the notification that the fire sensing device 212 initiated the fire response and transmit the notification that the fire sensing device 212 initiated the fire response to the computing device 200 based on the logic of the control panel 214.

The control panel 214 can be coupled to the output device 216. In a number of embodiments, the control panel 214 can transmit a command to the output device 216 to perform an output event responsive to receiving the notification that the fire sensing device 212 initiated the fire response based on the logic of the control panel 214. For example, the logic of the control panel 214 can be triggered responsive to initiating the fire response by the self-testing fire sensing device 212 and the output event can be triggered responsive to triggering the logic of the control panel 214. As such, initiating a fire response can be done to test the logic of the control panel 214.

The output device 216 can be an air vent, a relay, a beacon, a siren, a sounder, a door, or an elevator, for example. The output device 216 can include a processor 230 and a memory 232. Memory 232 can be any type of storage medium that can be accessed by processor 230 to perform various examples of the present disclosure. For example, memory 232 can be a non-transitory computer readable medium having computer readable instructions stored thereon that are executable by processor 230 to cause the output device 216 to perform an output event responsive to receiving a command and transmit a notification that the output device performed the output event to the control panel 214 and/or the computing device 200 responsive to performing the output event. The output event can include sounding a siren, providing a beacon, opening or closing a door or a vent, or bringing an elevator to a ground floor, for example.

In a number of embodiments, the control panel 214 can receive the notification that the output device 216 performed the output event and transmit the notification to the computing device 200. The control panel 214 can also transmit data to the computing device 200 including a number of output devices that are programmed to perform output events responsive to the fire sensing device 200 initiating the fire response. For example, the control panel 214 can store a number of output events that are supposed to be triggered responsive to each fire sensing device 200 initiating a fire response (e.g., being activated).

The computing device 200 can receive the notification that the output device 216 performed the output event and receive the data including the number of output devices that are programmed to perform output events responsive to the fire sensing device 212 initiating the fire response and compare the output device to the number of output devices. In a number of embodiments, the computing device 200 can determine that a different output device and the output device 216 are included in the number of output devices that are programmed to perform output events responsive to the fire sensing device 212 initiating the fire response. The computing device 200 can identify and display the output device 216 and the different output device on the user interface 206 of the computing device 200. In some examples, the computing device 200 can also display on the user interface 206 whether the output device 216 and/or the different output device performed the output events they were programmed to responsive to the fire sensing device 212 initiating the fire response.

The number of components of the system 210 including the computing device 200, the fire sensing device 212, the control panel 214, and the output device 216 can communicate via a wired or wireless network. Examples of such a network relationship can include a distributed computing environment (e.g., a cloud computing environment), a wide area network (WAN) such as the Internet, a local area network (LAN), a personal area network (PAN), a campus area network (CAN), or metropolitan area network (MAN), among other types of network relationships. For instance, the network can include a number of servers that receive information from, and transmit information to computing device 200, fire sensing device 212, control panel 214, and/or output device 216.

As used herein, a "network" can provide a communication system that directly or indirectly links two or more computers and/or peripheral devices and allows a computing device 200 to access data and/or resources on a fire sensing device 212, a control panel 214, and/or an output device 216 and vice versa. A network can allow users to share resources on their own systems with other network users and to access information on centrally located systems or on systems that are located at remote locations. For example, a network can tie a number of computing devices together to form a distributed control network (e.g., cloud).

A network may provide connections to the Internet and/or to the networks of other entities (e.g., organizations, institutions, etc.). Users may interact with network-enabled software applications to make a network request, such as to get data. Applications may also communicate with network management software, which can interact with network hardware to transmit information between devices on the network.

FIGS. 3A-3F are illustrations of a display provided on a user interface 306 of a computing device 300 showing an application for causing a self-testing fire sensing device to initiate a fire response, generated in accordance with one or more embodiments of the present disclosure. The computing device 300 and the user interface 306 can correspond to computing device 200 and user interface 206 of FIG. 2, respectively.

The application can be software/firmware included on an operating system of the computing device 300 and/or downloaded and/or installed on the computing device 300. In some examples, the application illustrated in FIGS. 3A-3F can be displayed on the user interface 306 responsive to receiving a selection to open the application via the user interface.

Figure 3A:
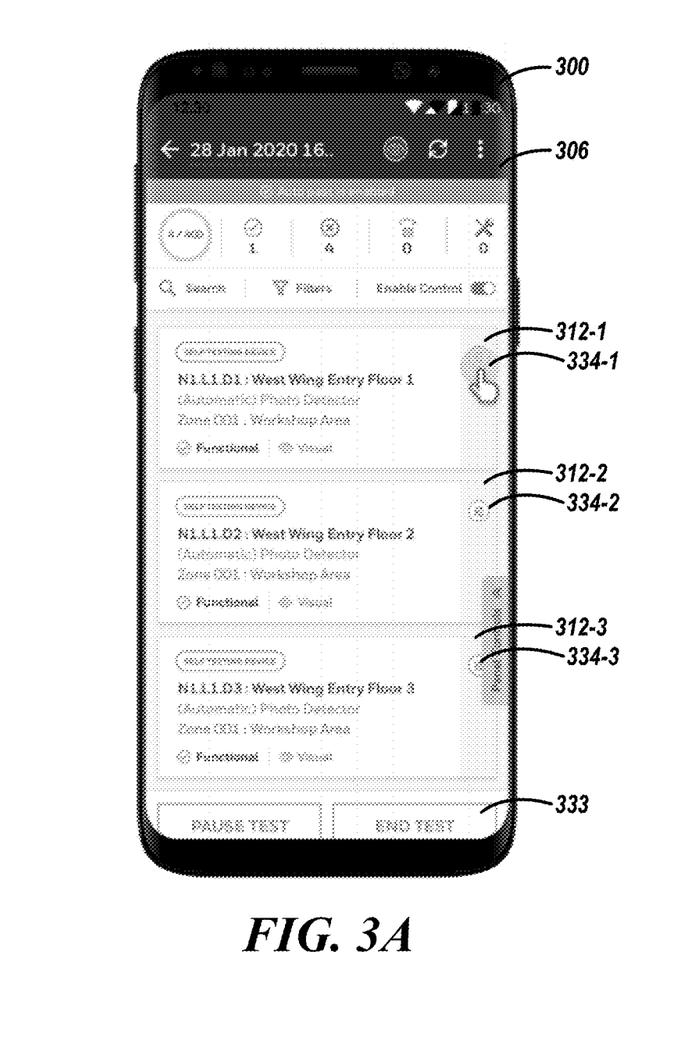
FIG. 3A is an illustration of a display provided on a user interface of a computing device showing an application for causing a self-testing fire sensing device to initiate a fire response, generated in accordance with one or more embodiments of the present disclosure.

As illustrated in FIG. 3A, the user interface 306 can present data representing a number of fire sensing devices 312-1, 312-2, and 312-3, which can correspond to fire sensing device 212 of FIG. 2. A user can select to initiate a fire response by selecting an icon 334-1 of the number of icons 334-1, 334-2, and 334-3 associated with a particular fire sensing device 312-1.

Once the user has completed validating the fire response, the user can select the end test icon 333 to end the fire response by the number of fire sensing devices 312-1, 312-2, and 312-3. A command to end the fire response can be transmitted from the computing device 300 to the number of fire sensing devices 312-1, 312-2, and 312-3, a control panel (e.g., control panel 214 of FIG. 2), or a number of output devices (e.g., output device 216 of FIG. 2). The user interface 306 can receive and display a report of the fire response, as illustrated in FIG. 3E, responsive to receiving the command to end the fire response. In a number of embodiments, the computing device 300 can transmit a command to reset the control panel responsive to receiving the command to end the fire response and/or responsive to receiving a selection via the user interface to reset the control panel.

Figure 3B:
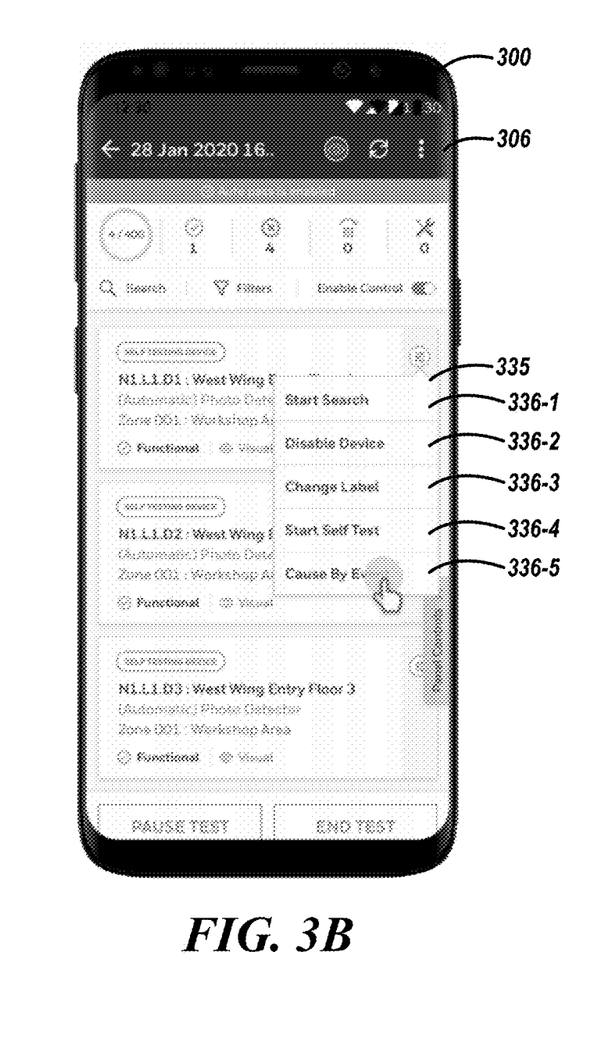
FIG. 3B is an illustration of a display provided on a user interface of a computing device showing an application for causing a self-testing fire sensing device to initiate a fire response, generated in accordance with one or more embodiments of the present disclosure.

As illustrated in FIG. 3B, the user interface 306 of the computing device 300 can present a drop-down menu 335 including a number of commands 336-1, 336-2, 336-3, 336-4, and 336-5 that can be transmitted to the particular fire sensing device 312-1. The commands can include starting a search 336-1, disabling the particular fire sensing device 312-1, changing a label 336-3 of the particular fire sensing device 312-1, starting a self-test 336-4 of the particular fire sensing device 312-1, and/or performing a cause by event 336-5 to initiate a fire response at the particular fire sensing device 312-1. The user can select the cause by event 336-5, as illustrated in FIG. 3B.

Figure 3C:
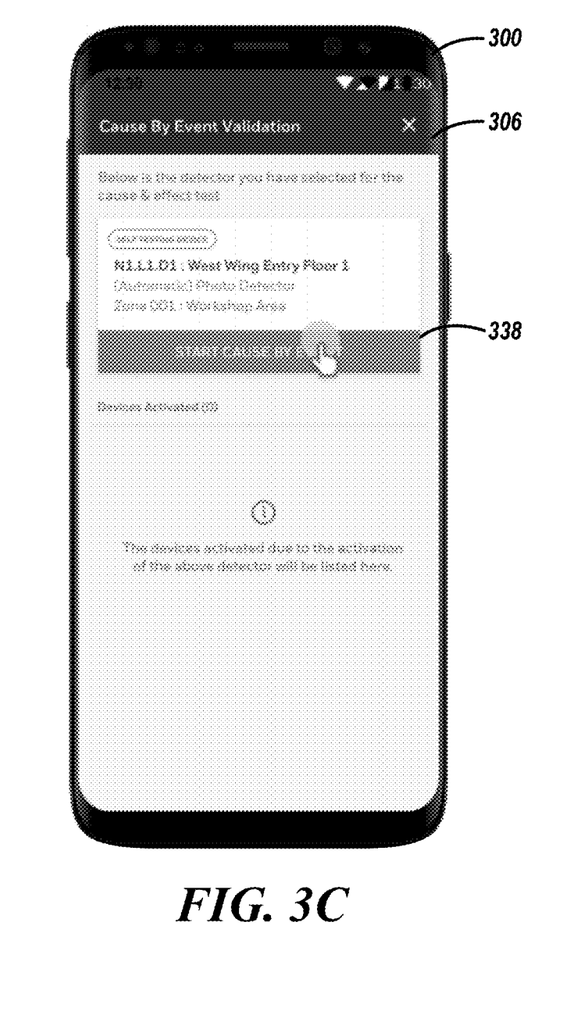
FIG. 3C is an illustration of a display provided on a user interface of a computing device showing an application for causing a self-testing fire sensing device to initiate a fire response, generated in accordance with one or more embodiments of the present disclosure.

The user interface 306 of the computing device 300 can present a start cause by event icon 338, as illustrated in FIG. 3C, responsive to the user selecting cause by event 336-5 from the drop-down menu 335 displayed on the user interface 306 of FIG. 3B. The user interface 306 of FIG. 3C can also display additional information about the particular fire sensing device 312-1, for example, the type, location, address, and/or label of the fire sensing device 312-1. The user can select to start the cause by event to initiate a fire response by selecting the start cause by event icon 338, as illustrated in FIG. 3C.

Figure 3D:
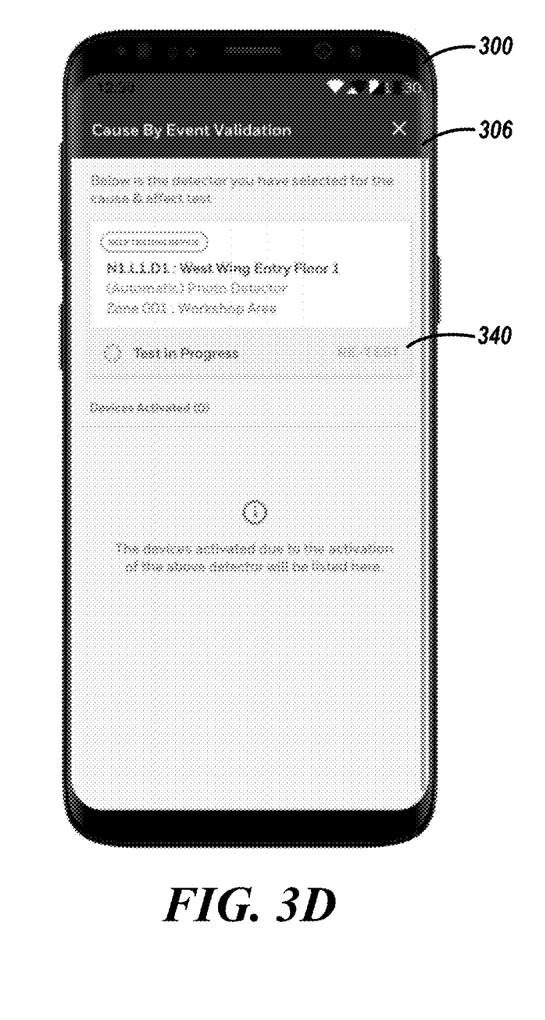
FIG. 3D is an illustration of a display provided on a user interface of a computing device showing an application for causing a self-testing fire sensing device to initiate a fire response, generated in accordance with one or more embodiments of the present disclosure.
Figure 3E:
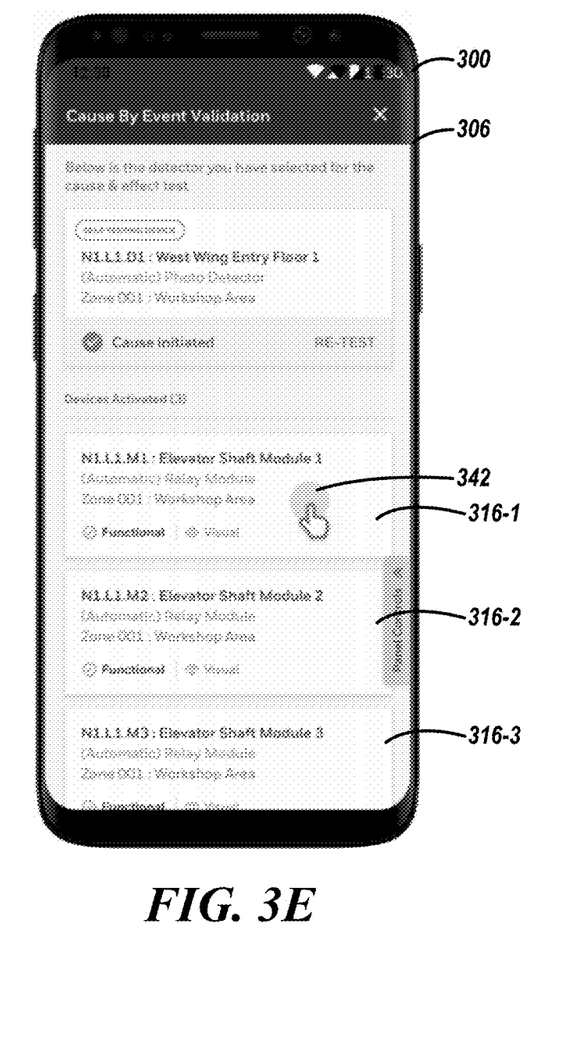
FIG. 3E is an illustration of a display provided on a user interface of a computing device showing an application for causing a self-testing fire sensing device to initiate a fire response, generated in accordance with one or more embodiments of the present disclosure.

The user interface 306 of the computing device 300 can present a test in progress icon 340, as illustrated in FIG. 3D, responsive to the user selecting the start cause by event icon 338, the computing device 300 transmitting a command to the particular fire sensing device 312-1 to initiate the fire response and/or the computing device 300 receiving a notification that the particular fire sensing device 312-1 has initiated the fire response from the particular fire sensing device 312-1 and/or the control panel. The user interface 306 of the computing device 300 of FIG. 3D can also display the additional information about the particular fire sensing device 312-1, for example, the type, location, address, and/or label of the fire sensing device 312-1.

The user interface 306 of the computing device 300 can present data representing a number of output devices 316-1, 316-2, and 316-3, which can correspond to output device 216 of FIG. 2, responsive to the computing device 300 receiving a notification that the particular fire sensing device 312-1 has initiated the fire response from the particular fire sensing device 312-1 and/or a control panel (e.g., control panel 214 of FIG. 2). The notification can be a report including a number of output events that were triggered, a number of output events that were not triggered, and/or a number of output events that were supposed to be triggered by the initiation of the fire response by the particular fire sensing device 312-1.

The user interface 306 of FIG. 3E can display information about each of the number of output devices 316-1, 316-2, and 316-3 including the type, location, address, and/or label, whether it is functional (e.g., performed an output event), and/or whether the function was visually inspected. The user can select an icon 342 corresponding to a particular output device 316-1, as illustrated in FIG. 3E.

Figure 3F:
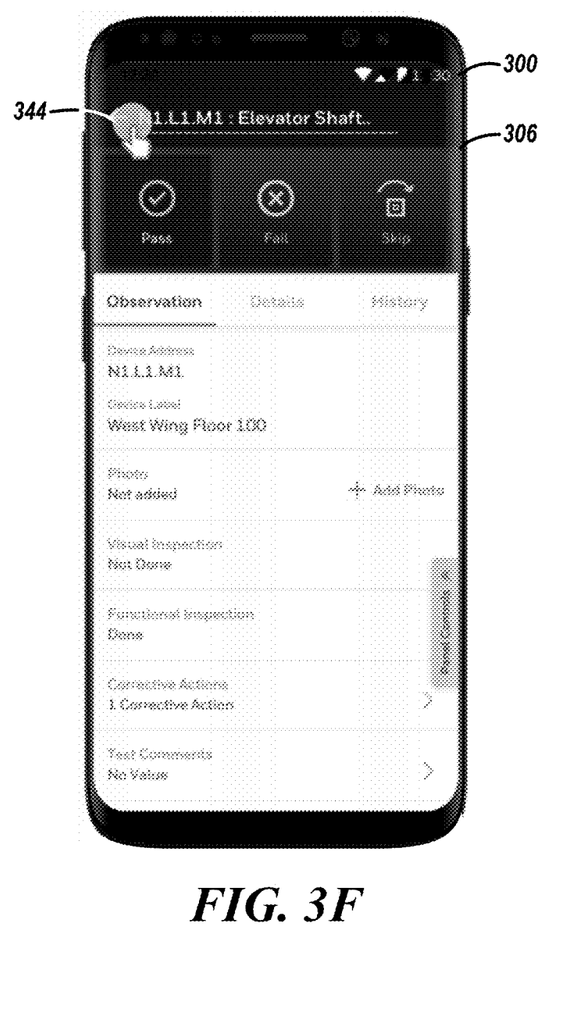
FIG. 3F is an illustration of a display provided on a user interface of a computing device showing an application for causing a self-testing fire sensing device to initiate a fire response, generated in accordance with one or more embodiments of the present disclosure.

The user interface 306 of the computing device 300 of FIG. 3F can display additional information pertaining to the performance of the particular output device 316-1 responsive to the user selecting icon 342 of FIG. 3E. The additional information displayed on the user interface 306 of FIG. 3F can include the address, label, photo, whether a visual inspection was done, whether a function inspection was done, whether there are corrective actions to be done, test comments, details, history, and/or whether the particular output device 316-1 passed, failed, or skipped the fire response. To return to the user interface 306 of FIG. 3E, the user can select icon 344 of FIG. 3F.

FIG. 4 illustrates a block diagram of a self-test function of a fire sensing device 412 in accordance with an embodiment of the present disclosure. The fire sensing device 412 can correspond to the fire sensing device 212 of FIG. 2. The fire sensing device 412 can include a controller 418, a processor 420, a memory 422, an adjustable particle generator 450, an optical scatter chamber 452, and a variable airflow generator 458, which can correspond to controller 218, processor 220, memory 222, adjustable particle generator 250, optical scatter chamber 252, and variable airflow generator 258 of FIG. 2, respectively.

Memory 422 can be any type of storage medium that can be accessed by processor 420 to perform various examples of the present disclosure. For example, memory 422 can be a non-transitory computer readable medium having computer readable instructions stored thereon that are executable by processor 420 to initiate a fire response at a fire sensing device 412 in accordance with the present disclosure. For instance, processor 420 can execute the executable instructions stored in memory 422 to generate an aerosol density level and/or trigger a synthesized software event responsive to receiving a command to initiate a fire response.

To initiate a fire response via a synthesized software event, the controller 418 can execute a command to activate the fire sensing device 412. To initiate a fire response via generating an aerosol density level the fire sensing device 412 can transmit a command to the adjustable particle generator 450 to generate particles. The particles can be drawn through the optical scatter chamber 452 via the variable airflow generator 458 creating a controlled aerosol density level. The aerosol density level can be sufficient to trigger a fire response without saturating the optical scatter chamber 452. As shown in FIG. 4, the optical scatter chamber 452 can include a transmitter light-emitting diode (LED) 454 and a receiver photodiode 456 to measure the aerosol density level. The fire sensing device 412 can be activated responsive to the measured aerosol density level reaching a threshold aerosol density level.

Activating the fire sensing device 412 can include triggering a fire response, which can include the fire sensing device 412 turning on an LED (e.g., LED 224 of FIG. 2), providing visual and/or audio alarms, and/or transmitting a notification to a control panel (e.g., control panel 214 of FIG. 2) and/or output devices (e.g., output device 216 in FIG. 2). A number of output devices can be triggered to perform output events responsive to the activation of the fire sensing device 412.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A computing device, comprising:
a user interface;
a memory;
a processor configured to execute executable instructions stored in the memory to:
receive, via the user interface, a selection to initiate a fire response;
receive, via the user interface, a selection of a self-testing fire sensing device to initiate the fire response;
transmit a command to the self-testing fire sensing device to initiate the fire response via generating an aerosol density level within the self-testing fire sensing device using an adjustable particle generator within the self-testing fire sensing device and drawing the aerosol density level through the self-testing fire sensing device to an optical scatter chamber within the self-testing fire sensing device; and
receive a notification of a number of output events triggered by the initiation of the fire response by the self-testing fire sensing device.

2. The computing device of claim 1, wherein the processor is configured to execute the instructions to:
receive, via the user interface, a selection to open an application; and
display, via the user interface, the selection to initiate the fire response responsive to receiving the selection to open the application.

3. The computing device of claim 1, wherein the processor is configured to execute the instructions to display, on the user interface, the number of output events triggered by the initiation of the fire response by the self-testing fire sensing device.

4. The computing device of claim 1, wherein the processor is configured to execute the instructions to:
receive, via the user interface, a selection to end the fire response by the self-testing fire sensing device; and
transmit a command to the self-testing fire sensing device to end the fire response.

5. The computing device of claim 1, wherein the processor is configured to execute the instructions to:
receive, via the user interface, a selection to reset a control panel coupled to the self-testing fire sensing device; and
transmit a command to the control panel to reset the control panel.

6. The computing device of claim 1, wherein the processor is configured to execute the instructions to:
receive, via the user interface, a selection to initiate a different fire response;
receive, via the user interface, a selection of a different self-testing fire sensing device to initiate the different fire response; and
transmit a command to the different self-testing fire sensing device to initiate the different fire response.

7. The computing device of claim 6, wherein the processor is configured to execute the instructions to:
receive, via the user interface, a selection to end the fire response; and
receive, via the user interface, a report including the number of output events triggered by the initiation of the fire response by the self-testing fire sensing device and a number of output events triggered by the initiation of the different fire response by the different self-testing fire sensing device.

8. A method, comprising:
receiving, by a computing device, a selection to initiate a fire response;
receiving, by the computing device, a selection of a self-testing fire sensing device to initiate the fire response;
transmitting, from the computing device to the self-testing fire sensing device, a command to initiate the fire response;
receiving, by the self-testing fire sensing device, the command to initiate the fire response;
initiating the fire response by the self-testing fire sensing device via generating an aerosol density level within the self-testing fire sensing device using an adjustable particle generator within the self-testing fire sensing device and drawing the aerosol density level through the self-testing fire sensing device to an optical scatter chamber within the self-testing fire sensing device responsive to receiving the command;
triggering logic of a control panel responsive to initiating the fire response by the self testing fire sensing device; and
triggering an output event responsive to triggering the logic of the control panel.

9. The method of claim 8, wherein initiating the fire response includes triggering a synthesized software event at the self-testing fire sensing device.

10. The method of claim 8, further comprising recording the performance of the fire response via a camera of the computing device.

11. A fire control system, comprising:
a computing device configured to:
receive a selection to initiate a fire response;
receive a selection of a self-testing fire sensing device to initiate the fire response; and
transmit a command to the self-testing fire sensing device to initiate the fire response;
the self-testing fire sensing device configured to:
receive the command to initiate the fire response; and
initiate the fire response via generating an aerosol density level within the self-testing fire sensing device using an adjustable particle generator within the self-testing fire sensing device and drawing the aerosol density level through the self-testing fire sensing device to an optical scatter chamber within the self-testing fire sensing device responsive to receiving the command; and
a control panel configured to:
receive a notification that the self-testing fire sensing device initiated the fire response; and
transmit the notification that the self-testing fire sensing device initiated the fire response to the computing device.

12. The system of claim 11, further comprising an output device, wherein the control panel is configured to transmit a command to the output device to perform an output event responsive to receiving the notification that the self-testing fire sensing device initiated the fire response.

13. The system of claim 12, wherein the output device is an air vent, a relay, a sounder, a door, or an elevator.

14. The system of claim 12, wherein the output device is configured to:
   perform the output event responsive to receiving the command; and
   transmit a notification that the output device performed the output event to the control panel responsive to performing the output event.

15. The system of claim 14, wherein the control panel is configured to:
   receive the notification that the output device performed the output event; and
   transmit the notification that the output device performed the output event to the computing device.

16. The system of claim 15, wherein the control panel is configured to transmit data to the computing device including a number of output devices that are programmed to perform output events responsive to the self-testing fire sensing device initiating the fire response.

17. The system of claim 16, wherein the computing device is configured to:
   receive the notification that the output device performed the output event;
   receive the data including the number of output devices that are programmed to perform output events responsive to the self-testing fire sensing device initiating the fire response; and
   compare the output device to the number of output devices.

18. The system of claim 17, wherein the computing device is configured to:
   determine that a different output device and the output device are included in the number of output devices that are programmed to perform output events responsive to the self-testing fire sensing device initiating the fire response; and
   identify the different output device on a user interface of the computing device.

19. The system of claim 11, wherein the self-testing fire sensing device includes a light-emitting diode configured to turn on responsive to the self-testing fire sensing device initiating the fire response.

* * * * *